(12) United States Patent
Garofalo

(10) Patent No.: US 9,243,864 B2
(45) Date of Patent: Jan. 26, 2016

(54) PNEUMATIC SPEARGUN FOR SPEARFISHING AND METHOD OF USE

(71) Applicant: Giovanni Garofalo, Rapallo (IT)

(72) Inventor: Giovanni Garofalo, Rapallo (IT)

(*) Notice: Subject to any disclaimer, the term of this patent is extended or adjusted under 35 U.S.C. 154(b) by 74 days.

(21) Appl. No.: 14/251,501

(22) Filed: Apr. 11, 2014

(65) Prior Publication Data

US 2014/0318521 A1 Oct. 30, 2014

(30) Foreign Application Priority Data

Apr. 24, 2013 (IT) ............................. GE2013A0044

(51) Int. Cl.
| | | |
|---|---|---|
| *F41B 11/83* | (2013.01) | |
| *F41B 11/73* | (2013.01) | |
| *F41B 7/04* | (2006.01) | |

(52) U.S. Cl.
CPC ................ *F41B 11/83* (2013.01); *F41B 11/73* (2013.01); *F41B 7/04* (2013.01)

(58) Field of Classification Search
CPC ....... A01K 81/04; A01K 81/00; A01K 81/06; F41B 7/04; F41B 11/83; F41B 11/62; F41B 5/1488
USPC ........... 124/56, 57, 58, 61, 69, 70, 71, 73, 75; 43/6
See application file for complete search history.

(56) References Cited

U.S. PATENT DOCUMENTS

| | | | | |
|---|---|---|---|---|
| 3,016,891 A * | 1/1962 | Ebeling | ...................... | F41B 7/04 124/22 |
| 3,741,190 A * | 6/1973 | Lopez | ....................... | F41B 7/04 124/22 |
| 4,895,128 A * | 1/1990 | Okada | ........................ | F41B 7/04 124/22 |
| 5,931,145 A * | 8/1999 | Oviedo-Reyes | .......... | F41B 5/12 124/20.3 |
| 7,926,474 B2 * | 4/2011 | Berry | ...................... | A01K 81/06 124/20.3 |
| 8,312,869 B2 * | 11/2012 | Gillet | ...................... | A01K 81/00 124/20.3 |
| 8,387,602 B1 * | 3/2013 | Bruington | ................. | F41B 7/04 124/20.3 |
| 2004/0173197 A1 * | 9/2004 | Moffitt | .................... | F41B 11/83 124/74 |
| 2009/0159065 A1 * | 6/2009 | Moffitt | ................... | A01K 81/00 124/71 |
| 2012/0085330 A1 * | 4/2012 | Hickerson | .............. | A01K 81/04 124/22 |

FOREIGN PATENT DOCUMENTS

| | | | | |
|---|---|---|---|---|
| FR | 1583652 | 11/1969 | | |
| FR | WO 2012150387 A1 * | 11/2012 | ................ | F41B 7/04 |
| RU | 2026528 | 1/1995 | | |
| SI | WO 02079711 A1 * | 10/2002 | ............. | F41B 11/83 |
| WO | 9706399 | 2/1997 | | |
| WO | 2012150387 | 11/2012 | | |

OTHER PUBLICATIONS

Italian Ministry of Economic Development, Search Report, Dec. 17, 2013 (performed by the European Patent Office; pp. 6-8 are in English).

* cited by examiner

*Primary Examiner* — Benjamin P Lee
(74) *Attorney, Agent, or Firm* — Themis Law

(57) ABSTRACT

A pneumatic speargun for spearfishing and a related method of loading and firing includes a cylinder having a head and a body with a hand grip, a slide guide for a spear, a reservoir for a pressurized fluid, and a barrel connected to the reservoir. A piston is slidingly mounted in the barrel for movement from an end loading positions, in which it is retained, to an end discharge position. A trigger releases the retaining system and causes the piston to move from the selected end loading position to the end discharge position. The piston in the loading position is removably connected to the spear via a cable and a return system and the spear becomes propelled as the piston moves from the end discharge position to the selected end loading position by pulling the cable.

14 Claims, 9 Drawing Sheets

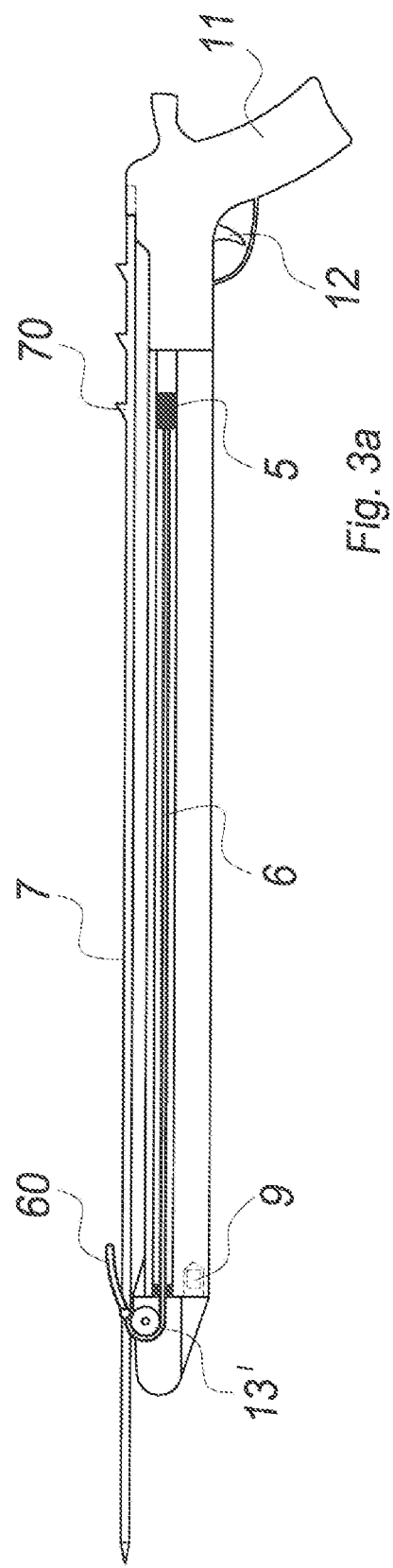
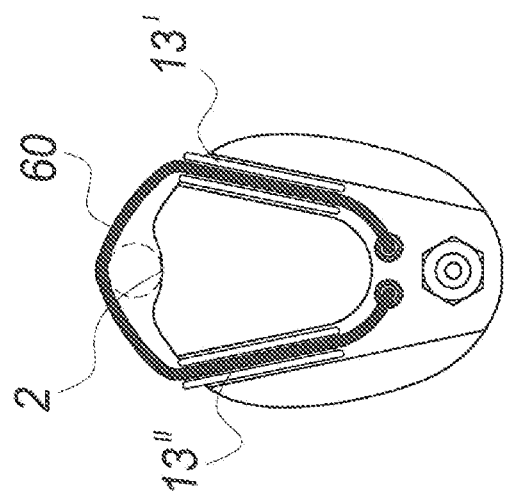
Fig. 3a
Fig. 3b

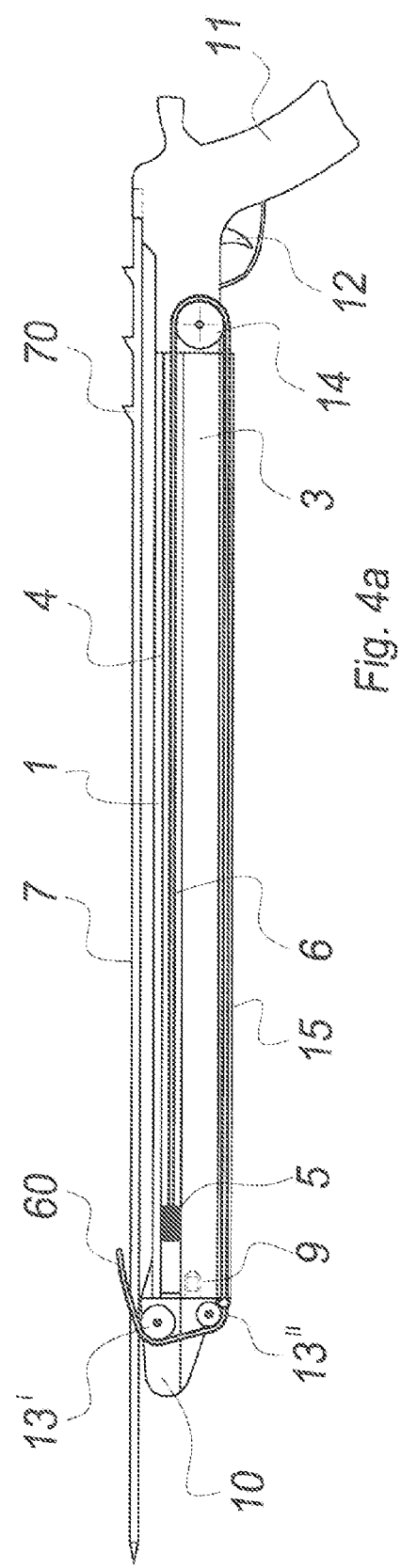
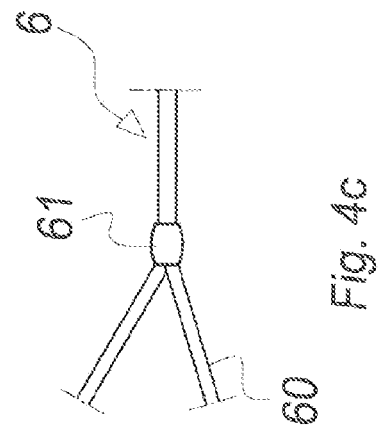
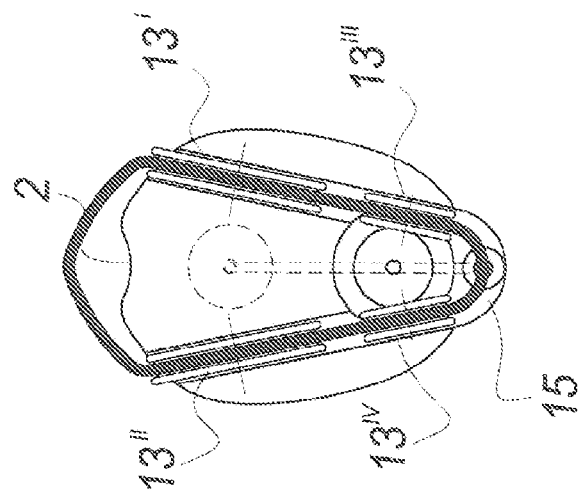

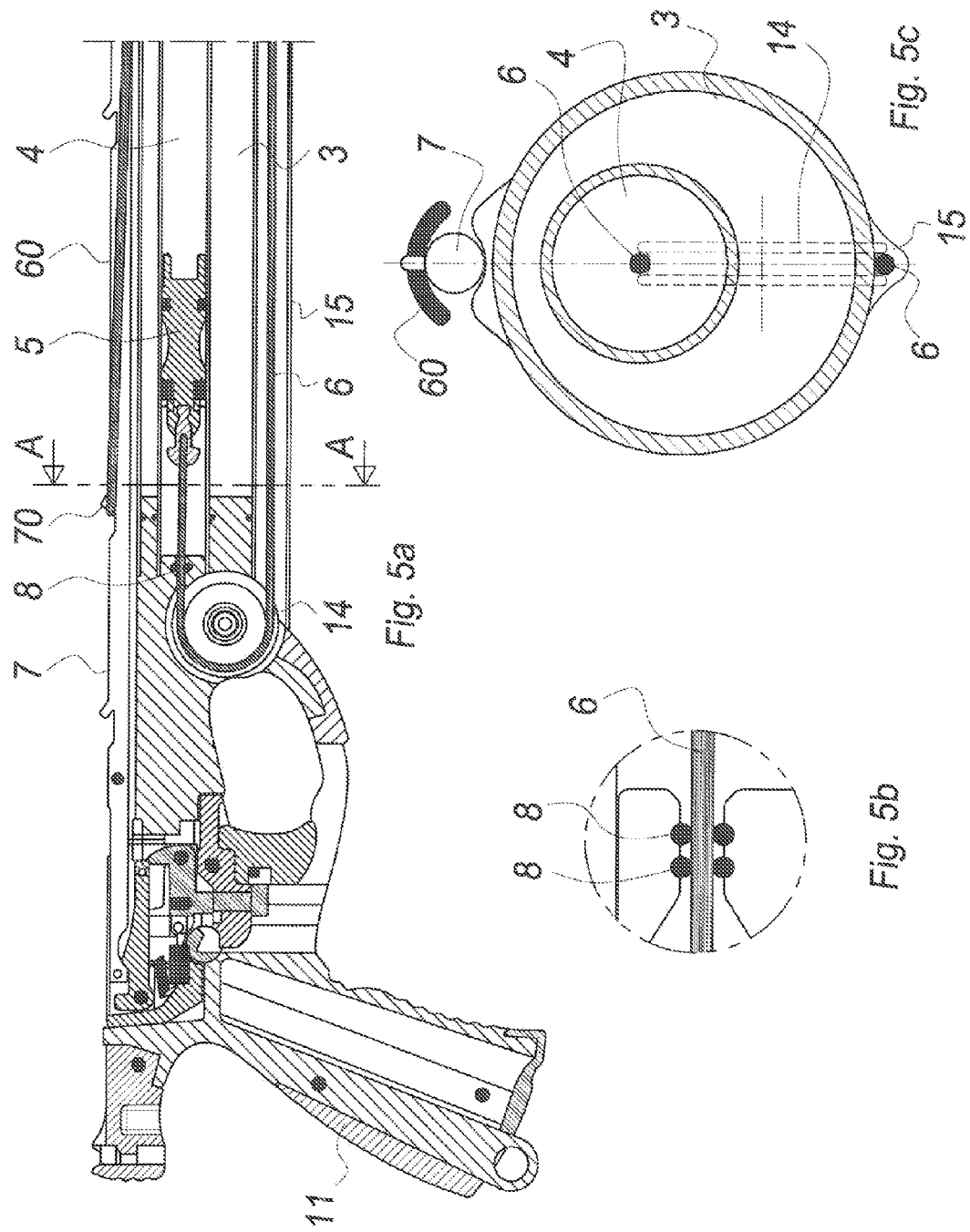

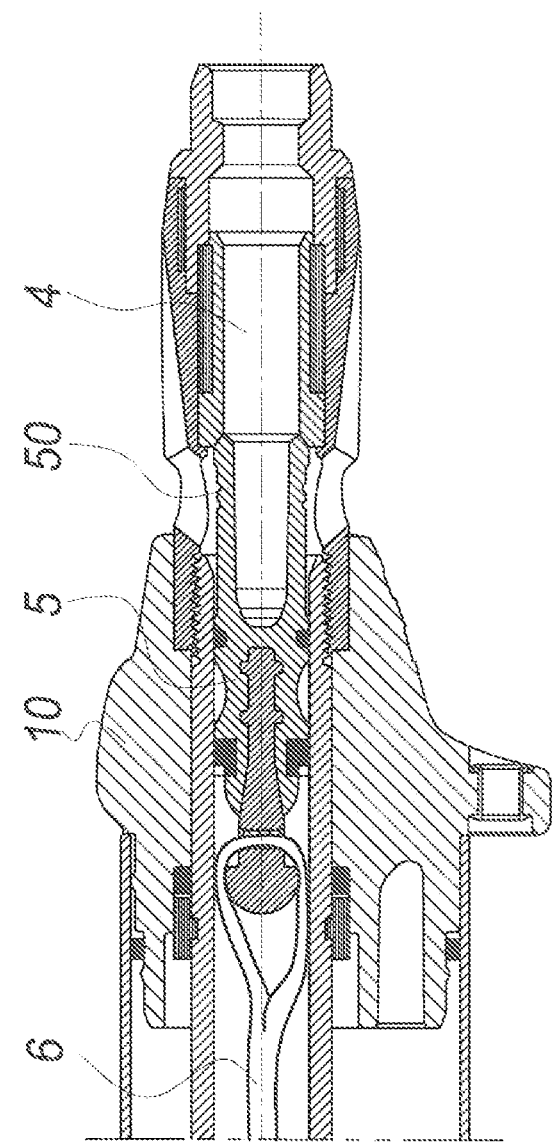

PNEUMATIC SPEARGUN FOR SPEARFISHING AND METHOD OF USE

FIELD OF THE INVENTION

The present invention relates to a pneumatic speargun for spearfishing having a barrel with a head at its front and a body with a hand grip at its back, a slide guide for a spear, a reservoir for a pressurized fluid and a barrel connected with such reservoir.

A piston is slidingly mounted in the barrel, for movement from one or more end loading positions, in which it is retained by a retaining system, to an end discharge position. A triggering system releases the retaining system and accordingly causes the piston to move from the selected end loading position to the end discharge position.

The piston is mechanically connected to the spear such that the piston causes the spear to be propelled as it moves from the selected end loading position to the end discharge position.

BACKGROUND OF THE INVENTION

In the current state of the art, spearguns may be divided into two classes: pneumatic spearguns and band-powered or Arbalete spearguns.

Arbalete spearguns have a continuous or discontinuous shaft guide at the top of the speargun body, thereby providing the advantage of proper aiming.

Additional advantages of Arbalete spearguns include, for example:
the possibility of using long spears, because the band is manually drawn into the firing position, and is not pushed by the spear;
the possibility of using thin spears, which are faster and cause less damage to the fish being hit;
a low weight;
a relatively simple construction;
a highly sensitive trigger;
low noise when fired, firing being only caused by release of the band;
low power loss as depth increases, as power is only provided by the compression of the band, which is typically hollow, and consequent loss of elasticity;
high load capacity, since the band is manually loaded using both arms, and back muscles can provide loads of about 50 kg.

Nevertheless, Arbalete spearguns have certain drawbacks, such as:
low power, unless multiple bands are used;
a greater overall length as compared with similar pneumatic spearguns;
vibrations of the band(s) during lateral movement of the speargun;
a loss of propelling force of the loaded band, with time and increasing depth;
no possibility of power adjustment.

In pneumatic spearguns as described hereinbefore, the slide guide typically consists of the barrel, with the spear being manually introduced therein, and the piston being pushed by the spear to the end loading position, where it is retained by a retaining system. This causes the worst drawback of pneumatic spearguns, i.e. difficult aiming, since the spear is not exposed outside the speargun in the loaded position, but is within the speargun body.

The end spear tip portion is generally outside the barrel in the loaded state, but aiming cannot be done perfectly in line with the spear shaft and hence it is altered or difficult.

Pneumatic spearguns have a number of advantages, such as:
very high power;
power adjustment features;
little or no vibration during movement;
power maintained over time;
more compact design.

Nevertheless, pneumatic spearguns also have drawbacks, such as:
difficult use of long or thin spears;
difficult loading of long spearguns;
high noise during firing;
less sensitive trigger;
loss of power with increasing depth;
limited load capacity, although a loading force of about 30 kg in a pneumatic speargun provides about 50% higher power as compared with a 50 kg loaded Arbalete speargun;
higher weight;
more complex construction;
higher cost.

In pneumatic spearguns, the barrel is filled with water in the loaded state, whereby the piston is required to push both the spear and the water between the spear and the cylinder walls, which causes a power loss.

The friction of the ejected water adds to the mass to be pushed by the piston.

For this reason, pneumatic spearguns generally have large holes in their barrel to allow water ejection.

In an attempt to obviate this drawback, "dry" pneumatic systems have been developed, in which a hydraulic seal is provided at the mouth of the barrel, typically an O-ring acting upon the side surface of the spear.

"Dry" spearguns have the advantage of avoiding the need of pushing water out of the barrel, whereby they provide higher efficiency and hence higher powers, with less noise.

Nevertheless, these spearguns have certain drawbacks such as higher complexity, lower reliability, higher costs and high wear of the seal, in addition to restrictions in the shape and functions of the spears.

SUMMARY OF THE INVENTION

The present invention has the object of obviating the above mentioned drawbacks of prior art spearguns for spearfishing by providing a pneumatic speargun as described hereinbefore, in which the piston is further removably connected to the spear via a cable and a return system, such that the piston is moved from the end discharge position to the selected end loading position by pulling the cable.

Thus, the provision of a return system and the fact that the piston is loaded by pulling the cable ensures the same high-load feature of Arbalete spearguns, as the piston may be loaded by pulling the cable with both arms.

In one exemplary embodiment, the above-mentioned slide guide is located at the top of the cylinder.

This allows the spear to be placed outside the speargun body, which affords both the same easy-aiming feature as in Arbalete spearguns and the use of the same type of spears as in Arbalete spearguns.

The slide guide may extend along the entire cylinder or a part of it in either continuous or discontinuous fashion, e.g. with a portion at the head and a portion on the body with the hand grip.

In a further exemplary embodiment, the barrel is kept watertight by the provision of a hydraulic seal configured to lead the cable out of the barrel end proximate to the end loading position of the piston.

Thus, the construction of the speargun is similar to the construction of a "dry" speargun but is less exposed to wear than the latter, as the seal does not act upon the spear but upon the cable.

This feature, in addition to the possibility of loading with both arms, provides maximized power, with at least 60% higher power than a "dry" pneumatic speargun, as tested.

Many different features may be also selected during design, for example by adjusting the diameters of the barrel and reservoir, whereas in current pneumatic spearguns the inside diameter of the barrel cannot be increased beyond a given value because this would require too much water to be expelled from the barrel.

The watertightness of the barrel further considerably attenuates noise during firing.

In an alternative embodiment, the barrel is open in the direction of the end discharge position of the piston.

In a further exemplary embodiment, the return system consists of at least one pulley at the head and/or the body of the speargun.

A speargun according to the present invention also provides the following advantages:
as depth increases, power is maintained and even slightly increases, e.g. by about 0.7% at 30 m depth;
the triggering system releasing the retaining system include a release mechanism similar to that of Arbalete spearguns, and hence a very sensitive trigger;
vibration during movement is dramatically reduced;
buoyancy and trim are improved;
various construction technologies may be used;
costs are reduced.

In a first variant embodiment, the end loading position is proximate to the front of the cylinder and the end discharge position is proximate to the back of the cylinder.

In a first embodiment of this first variant, the head has at least one pulley such that the cable that comes out of the barrel is returned toward the bottom of the cylinder, where it forms a loop around the cylinder.

In a second embodiment of this first variant, the cable is divided into two parts that come out of the barrel parallel to each other, the head having two or more pulleys, such that the two parts of the cable that come out of the barrel are returned toward the top of the cylinder, where they join into a loop.

In a second variant embodiment, the end loading position is proximate to the back of the cylinder and the end discharge position is proximate to the front of the cylinder.

In one embodiment of this second variant, at least one rear pulley is provided in the speargun body, proximate to the back of the barrel, such that the cable comes out of the barrel and is returned toward the bottom of the cylinder, where it forms a loop having two branches that extend parallel toward the head, the head having two or more front pulleys, such that the two branches of the loop are returned toward the top of the cylinder.

According to an improvement, the cylinder has a fairing at its bottom, for housing the cable portion between the rear pulley and the front pulleys.

The fairing may be watertight or filled with water, i.e. due to the presence of one or more openings, which would be convenient in terms of construction simplicity.

In a further exemplary embodiment, the reservoir is coaxially arranged around the barrel.

In yet another exemplary embodiment, the reservoir consists of the barrel.

In this case, the reservoir has the same diameter as the piston, which improves construction simplicity and ensures very low costs.

In a further exemplary embodiment, means are provided for absorbing the impact of the piston against the end of the barrel, when the piston comes to the end discharge position.

In prior art pneumatic means, the impact-absorbing means include two circular rings, at the mouth of barrel and on the piston respectively, which are designed to abut against each other.

This arrangement is required because the barrel must have an outlet for the spear at its center.

In the present invention, the piston and the end of the barrel may advantageously abut against a surface that is as large as the entire diameter of the barrel.

The present invention also relates to a method of loading and firing a pneumatic speargun for spearfishing comprising the steps of:
moving a piston from an end discharge position to a selected end loading position in a barrel connected to a reservoir for a pressurized fluid;
retaining the piston in the selected end loading position;
releasing the piston from the end loading position, thereby causing the piston to move from the end loading position to the end discharge position; and
mechanically transferring the force of the piston to a spear for propulsion thereof,
wherein the piston is moved from the end discharge position to the selected end loading position by pulling a cable that removably connects the piston to the spear via a return system.

BRIEF DESCRIPTION OF THE DRAWINGS

These and other features and advantages of the invention will be more apparent from the following description of a few embodiments shown in the accompanying drawings, in which:

FIGS. 3a and 3b show different views and details of a second exemplary embodiment;

FIGS. 4a, 4b and 4c show different views and details of a third exemplary embodiment;

FIGS. 5a, 5b and 5c show details of the back of the speargun according to the third exemplary embodiment;

FIG. 7 shows a variant embodiment in which the barrel is open in the direction of the end discharge position of the piston;

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
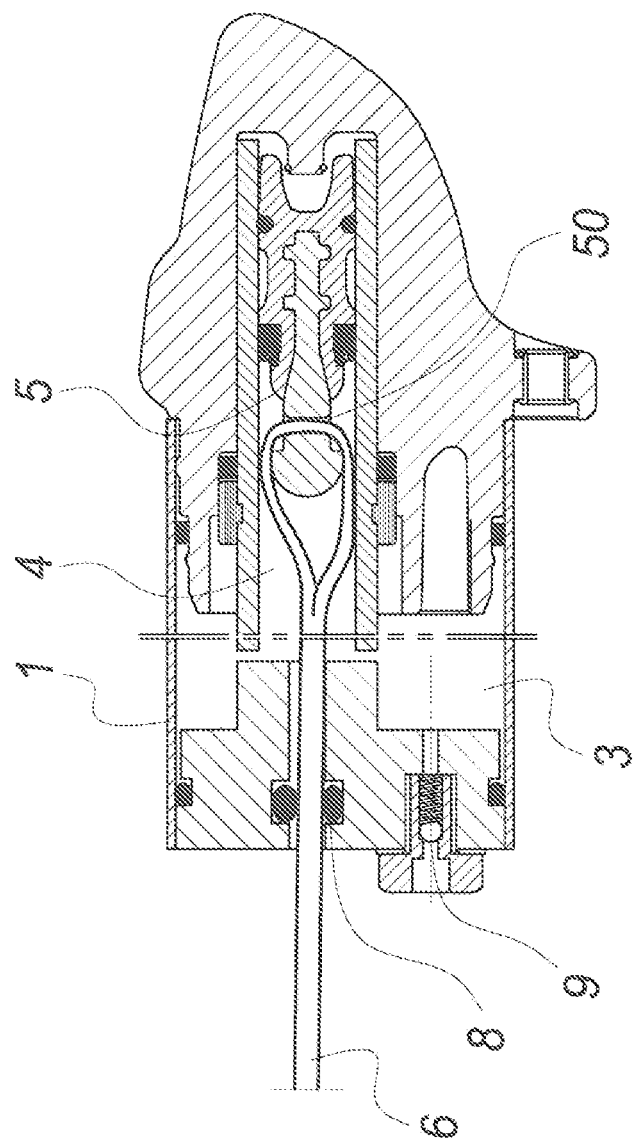
FIG. 1 shows the operation principle of a speargun according to the invention.

FIG. 1 is a detailed view of an exemplary embodiment illustrating the principle of operation of a speargun according to the present invention.

The piston 5 slides in the barrel 4, and the barrel 4 is connected with the reservoir 3 containing a pressurized fluid, preferably air.

Unlike pistons of prior art pneumatic spearguns, this piston is not pushed by the spear when the spear is being introduced into the barrel to the selected end loading position, in which it is retained by a retaining system, but it is pulled by a cable 6 to the end loading position.

The cable may be coupled to the piston in any known manner, preferably via a transverse hole 50, through which one end of the cable is introduced, and is closed on the cable itself.

The barrel is kept watertight by a hydraulic seal configured to lead the cable out of the barrel end proximate to the end loading position of the piston.

The hydraulic seal may be of any type and preferably consist of one or more O-rings 8, which have a sealing action on the side surface of the cable.

The reservoir has a valve 9, through which it may be filled with liquid.

Figure 2A:
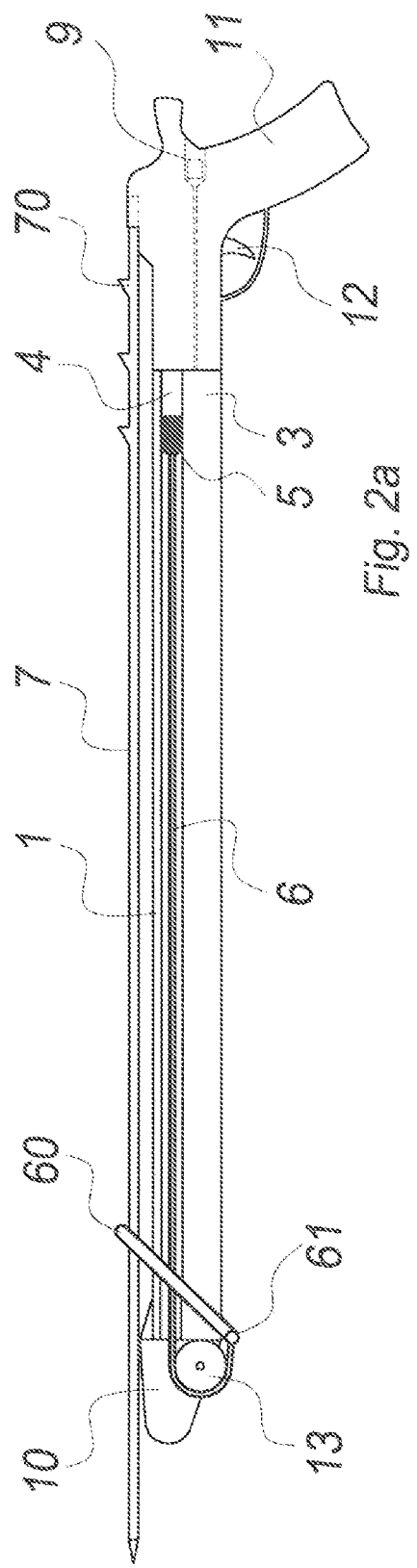
FIGS. 2a, 2b and 2c show different views and details of a first exemplary embodiment.

FIG. 2a shows a general side view of a first exemplary embodiment, which shows the speargun having a cylinder 1 with a head 10 at the front and a body with a hand grip 11 at the back.

The cylinder 1 has a reservoir 3 for a pressurized fluid, preferably air, and a barrel 4 connected with the reservoir 3.

The barrel 4 has a piston 5 slidingly mounted therein, which is movable from an end loading position in which it is retained by a retaining system and an end discharge position, as shown in FIG. 2A.

A triggering system is provided for releasing the retaining system, said triggering system being controlled by a trigger 12.

In the loaded state, the piston 5 is mechanically connected to a spear 7 via a cable 6 and a return system, such that, as the piston moves from the selected end loading position to the end discharge position, it causes the spear to be propelled.

The piston 5 is moved from the end discharge position to the end loading position by pulling the cable 6.

The end discharge position 5 is proximate to the front of the cylinder 1, i.e. proximate to the head 10, and the end discharge position is proximate to the back of the cylinder 1, i.e. proximate to the body with the hand grip 11.

The return system include a pulley 13 located proximate to the head 10, such that the cable 6 coming out of the barrel 4 is returned toward the bottom of the cylinder 1, where it forms a loop 60 or eye surrounding the cylinder 1.

More particularly, at the end of the piston 5 opposite to the pulley 13, the cable 6 is divided into two parts extending on each side of the cylinder and joining at the top of the cylinder into the loop 60, in a region where the cable 6 is attached to the spear 7.

During loading, the loop 60 acts as a handle to be manually pulled toward the body with the hand grip 11, for moving the piston 5 toward the head 10 to the selected end loading position.

As the trigger is actuated, the piston 5 is pushed by the pressurized fluid along the barrel 4 toward the body with the hand grip 11 of the head 10 to the end discharge position, whereas the loop 60 is pushed toward the head 10 and carries along the spear, thereby causing its propulsion.

The pulley 13, like the pulleys described below, may be made of plastic or metal, and may be mounted to a bushing or, preferably, a bearing.

The valve 9 for filling fluid to the reservoir 3 is placed at the back, in the body with the hand grip 11.

Figure 6B:
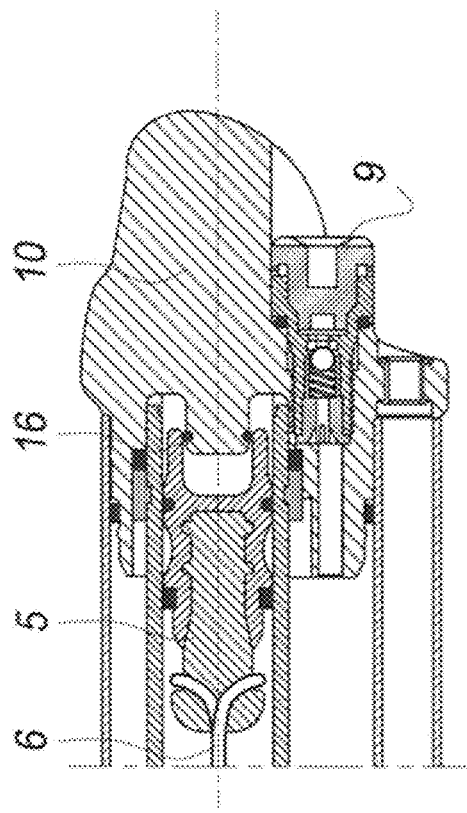
FIGS. 6a, 6b, 6c and 6d show details of the front of the speargun according to the third exemplary embodiment.

The valve 9 may be located in the body with the hand grip 11, in the head 10, as shown for instance in FIG. 6b, or at one side.

The loop 60 may be formed, for instance, of the cable 6 doubled back on itself.

Figure 2C:
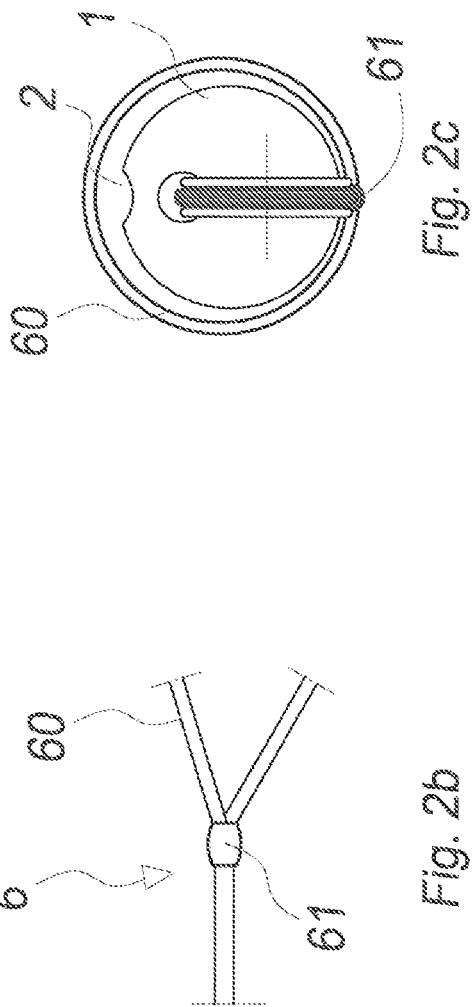
Figure 2B:
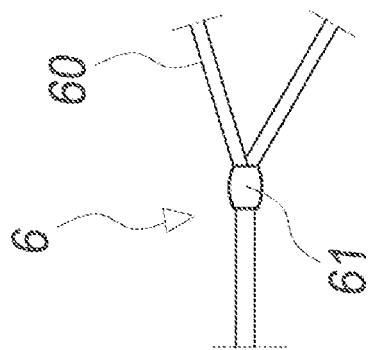

Preferably, as shown in the detail view of FIG. 2b, the single portion of the cable 6 and the loop 60 are separate elements coupled together, e.g. by a knot or a splice 62, and may be made of the same or different materials, either plastic or metal.

Preferably, the single portion of the cable 6 is made of synthetic polyamide, particularly nylon, whereas the loop 60 is made of polyethylene fibers, such as Dyneema®.

For example, the nylon cable may have a diameter of 2 mm, providing 110-150 kg pulling force, or a diameter of 2.5 mm, providing 160-200 kg pulling force.

FIG. 2c is a front view, which clearly shows the loop 60 extending around the cylinder 1.

The cylinder 1 also has a continuous or discontinuous slide guide for the spear, at the top of the cylinder 1, which consists of a groove longitudinally formed in the top side of the cylinder 1 or simply of grooves formed at the head 10 and the body with the hand grip 11.

FIGS. 3a and 3b are side and front views respectively of a second exemplary embodiment, in which the end loading position 5 is again proximate to the front of the cylinder 1 and the end discharge position is proximate to the back of the cylinder 1.

The cable 6 is divided throughout its length into two parts that come out of the barrel parallel to each other, through two seals, particularly two O-rings.

The head 10 has two pulleys $13^I$ and $13^{II}$, such that the two parts of the cable that come out of the barrel are returned to the top of the cylinder 1, where they join into a loop 60.

In this exemplary embodiment, the length of the loop 60 is equal to the entire length of the cable 6.

Nevertheless, also in this case the cable 6 may comprise a loop 60 and a single portion, as described above concerning FIGS. 2a, 2b and 2c, the loop 60 and the single portion of the cable 6 being made of either different or identical materials.

The operation is as described concerning FIGS. 2a, 2b and 2c, except that the cable 6 is returned to the top of the cylinder 1, and that the cable 6 is not formed of a single portion and a loop 60, but entirely consists of the loop 60, whereby two pulleys $13^I$ and $13^{II}$ are required.

The valve 9 for filling fluid to the reservoir 3 is placed at the front, in the head 10.

FIGS. 4a and 44b are side and front views respectively of a third exemplary embodiment, in which the end loading position 5 is proximate to the back of the cylinder 1 and the end discharge position, as shown in the figure, is proximate to the front of the cylinder 1.

A rear pulley 14 is provided in the speargun body, proximate to the back of the barrel, such that the cable 6 comes out of the barrel 4 and is returned toward the bottom of the cylinder 1, where it forms a loop 60, whose two branches extend parallel toward the head 10.

The head 10 has two upper front pulleys 13$^I$ and 13$^{II}$ and two lower front pulleys 13$^{III}$ and 13$^{IV}$ such that the two branches of the loop are returned toward the top of the cylinder.

The provision of an upper front pulley and a lower front pulley for each branch of the loop 60 is convenient in that it allows the cable 6 to be returned throughout the vertical length of the head 10.

As an alternative, two front pulleys only may be provided, one for each branch of the loop 60, whose diameter is selected according to the vertical length of the head 10.

FIG. 4c shows the point at which the cable 6 forms the loop 60.

The cylinder 1 has a fairing 15 at its bottom, for housing the cable portion between the rear pulley 15 and the front pulleys 13$^{III}$ and 13$^{IV}$.

The fairing is filled with water, due to the provision of two openings formed at each side of the longitudinal axis of the speargun.

In a further exemplary embodiment, not shown, the fairing is open at its bottom over a part or the whole of longitudinal extent.

The operation of this exemplary embodiment is also much as described concerning FIGS. 2a, 2b and 2c, except that the piston moves in the opposite direction.

The provision of a double return arrangement, i.e. a front pulley system combined with a rear pulley 14 allows the end of the loop in contact with the spear to move in the proper spear propelling direction.

FIG. 5a shows the back of the above described third exemplary embodiment in greater detail, with the spear 7 being shown as having one or more teeth 70 or ridges for engagement of the loop 60 and the rear pulley 14.

The O-ring seal 8 is visible at the rear end of the barrel 4.

FIG. 5b shows the seal in greater detail, with two O-rings being provided.

FIG. 5c is a sectional view along the plane A-A of FIG. 5a, showing the engagement of the loop 60 with the tooth 70 of the spear 7.

FIG. 5c also shows that the barrel 4 is inserted in the reservoir 33 in a substantially coaxial arrangement, and that the cable 6 is protected at the bottom of the cylinder 1 by the fairing 15.

Figure 6D:
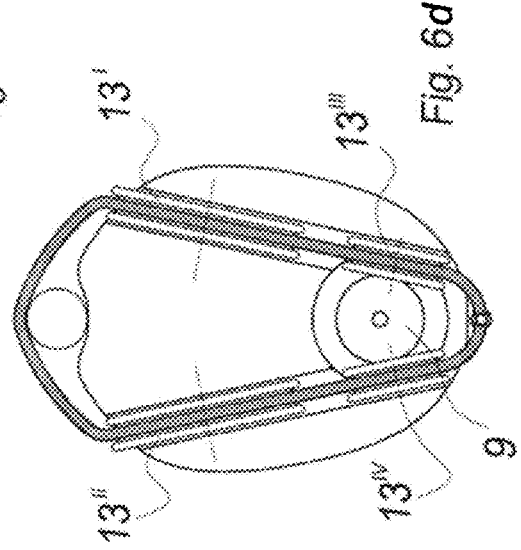
Figure 6A:
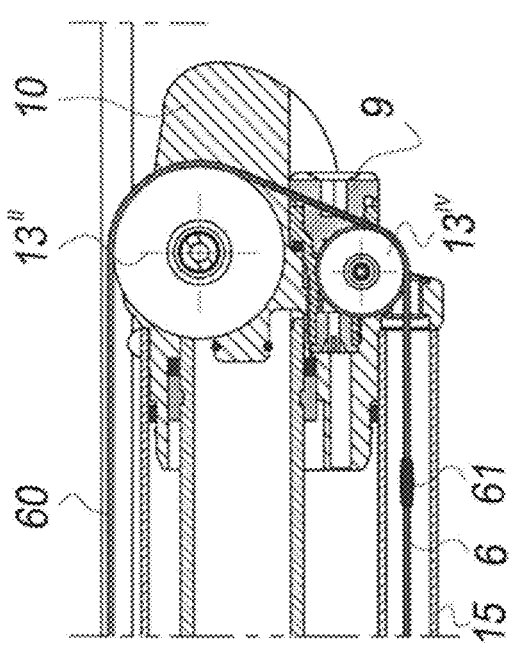

FIGS. 6a and 6b show lateral sectional views of the head 10 along different sectional planes.

Figure 6C:
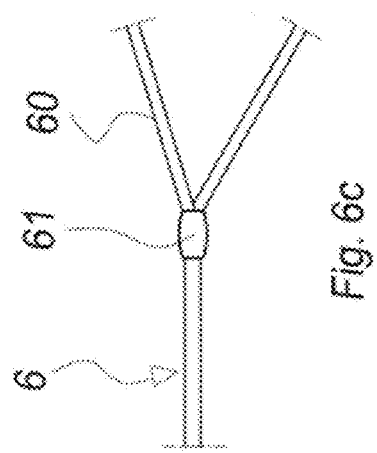

FIG. 6a shows the front pulleys 13$^{II}$ and 13$^{IV}$ and the point at which the cable 6 divides into the loop 60, as shown in FIG. 6c along a horizontal plane.

FIG. 6d shows the piston 5 and the cable 6 engaged with the piston 5, in addition to the filling valve 9, located at the front.

The figure further shows an example of the impact-absorbing means, particularly a rubber-based system 16.

Impact-absorbing means may also include, instead of or in addition to the above, air-, oil-, water-based systems or else.

The piston 5 may be also divided into two members, extending side-by-side along the longitudinal axis of the barrel 4, and having a rubber seal therebetween, which radially expands as pressure increases between the two members, thereby increasing the friction exerted on the inner walls of the barrel 4 and accordingly providing a braking effect on the piston 5.

While the valve 9 of the figures is a ball check valve, it may be of any known type.

FIG. 6d is a sectional view taken along the plane B-B of FIG. 6a.

In a further embodiment, as shown in FIG. 7, the end of the barrel 4 toward the head 10 is open, such that the piston contacts water, that will fill the barrel during loading and will be ejected during discharge.

The section of FIG. 7 does not show the pulleys of the head 10, although they are provided, like in FIG. 6a, to allow the spear 7 to be placed in the slide guide at the top of the cylinder 1.

In a further exemplary embodiment, a system is provided that is configured to hold the piston 5 in the end loading position, which may be disengaged by the trigger.

Thus, if the cable 6 is damaged to such an extent as to prevent the piston 5 from being loaded by pulling the cable, the piston 5 may be loaded like in a traditional pneumatic speargun, by placing the spear 7 in the barrel 4 and pushing the piston 5 to the end loading position by the spear 7 itself.

In this condition, the cable 6 that comes out of the barrel 4 will be conveniently cut or the cable exit area 8 will be blocked by a special closing plug.

In this case, the piston 5 will have a bell terminal 50 at the opening side, for housing the tail end of the spear 7 in the speargun loaded state.

Figure 8:
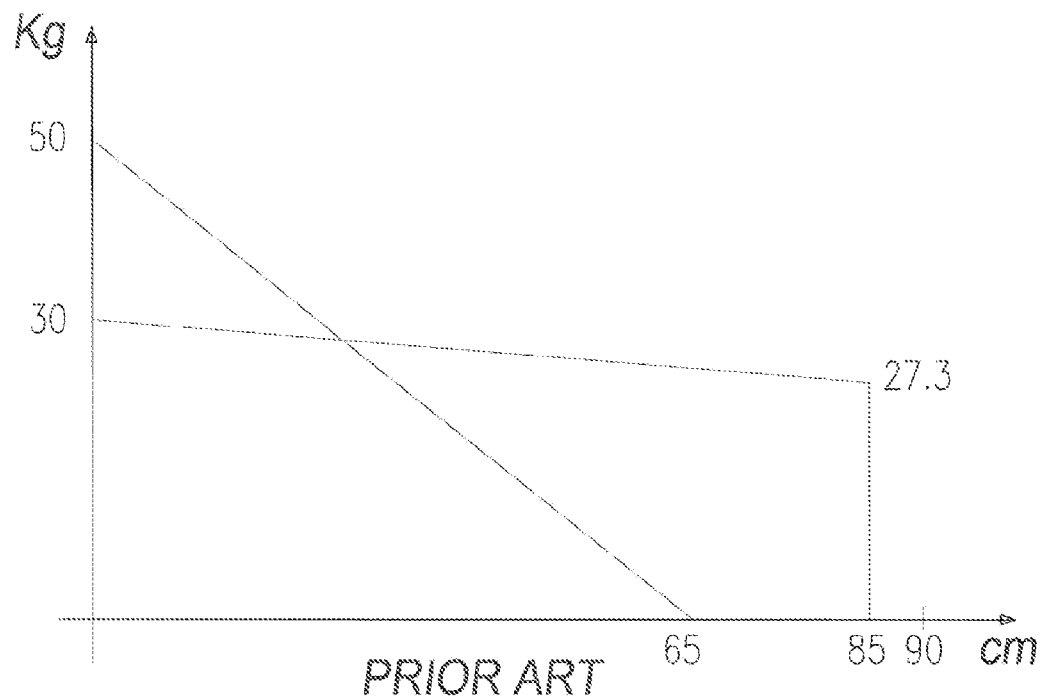
FIG. 8 shows a diagram that compares the energy stored during loading by prior art spearguns.

FIG. 8 shows a diagram that compares the energy stored during loading by prior art spearguns, particularly by an Arbalete speargun and a pneumatic speargun, both having a length of 90 cm.

The x-axis indicate the length of the speargun in centimeters, and the y-axis indicates the loading force in kilograms.

In the Arbalete speargun, when the band is stretched by 65 cm, the force linearly increases from 0 to the maximum load of 50 kg, and the stored energy is 1625 Kg·cm.

In the pneumatic speargun, with a compression ratio of 1:1.10, due to the action of pressurized air, when the spear is inserted and the piston is pushed to the end loading position by an extent of 85 cm, the force increases from 27.3 Kg to 30 Kg, and the stored energy is 2435 Kg·cm, i.e. about 50% higher than in the Arbalete speargun.

Figure 9:
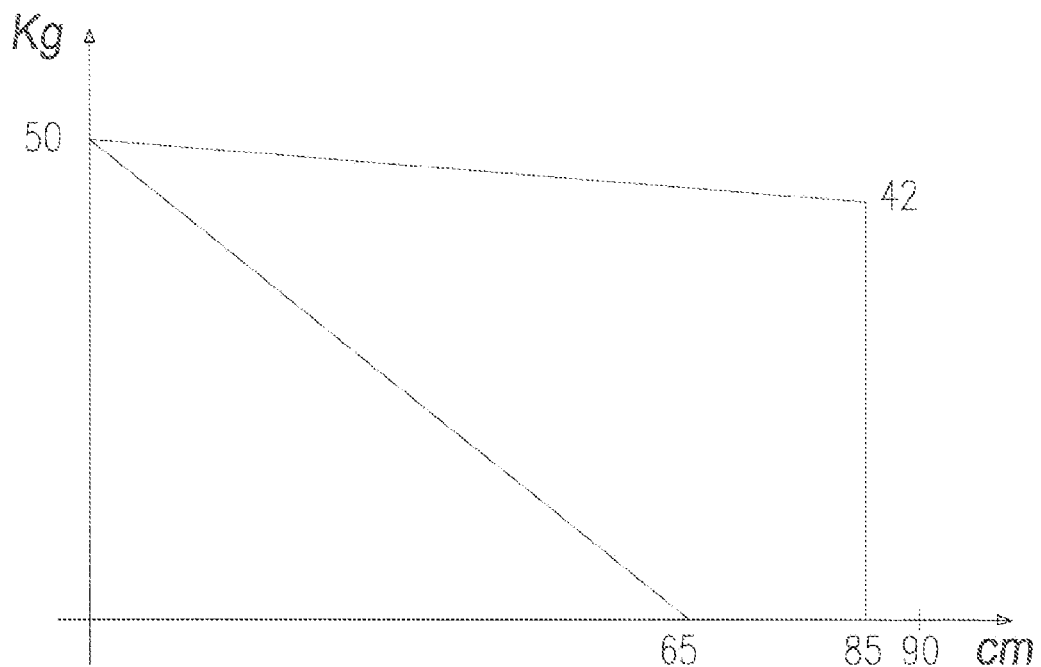
FIGS. 9 to 11 show diagrams that compare the energy stored during loading between a speargun according to the present invention and prior art spearguns.
Figure 10:
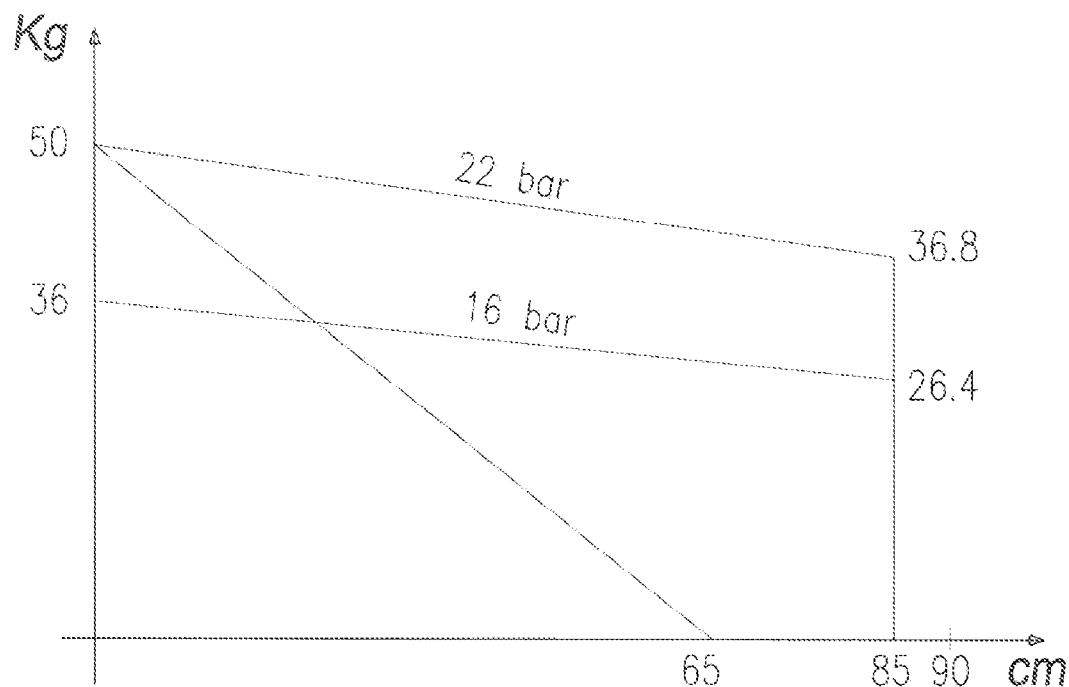
Figure 11:
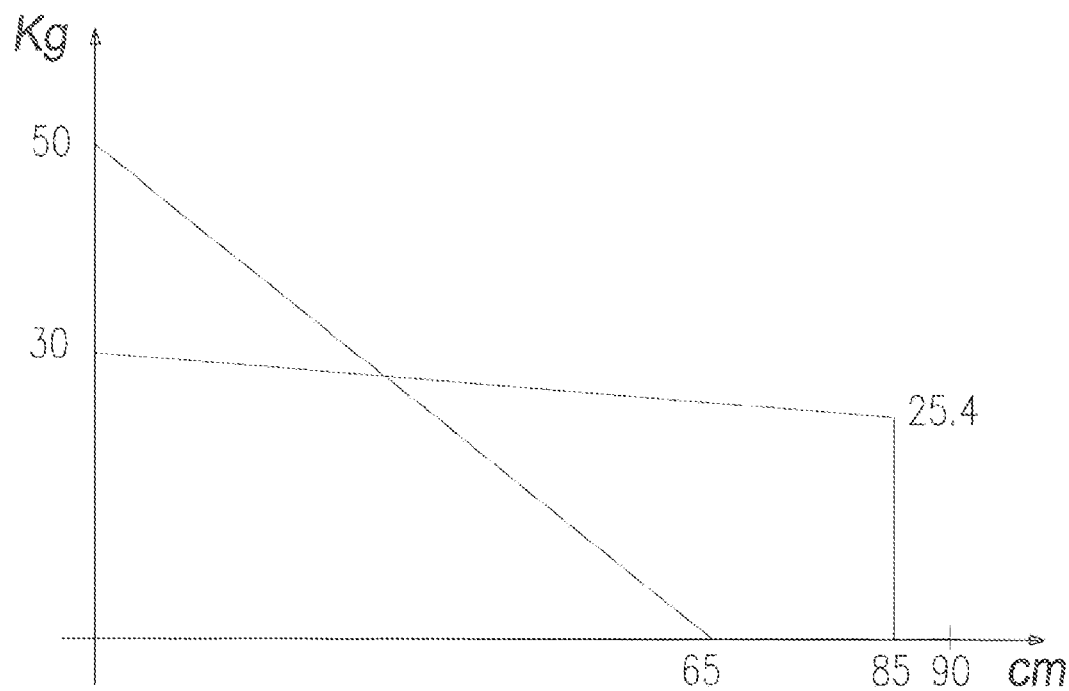

FIGS. 9, 10 and 11 show diagrams that compare the energy stored during loading by a known Arbalete spearguns with the parameters as set forth above concerning FIG. 7, and the speargun of the present invention, with different construction parameters.

In FIG. 9, the inventive speargun has a piston with a diameter of 15 and a compression ratio of 1:1.18.

Due to the action of pressurized air, as the cable 6 is pulled to move the piston to the end loading position by an extent of 85 cm, the force increases from 42 Kg to 50 Kg, and the stored energy is 3910 Kg·cm, i.e. about 240% higher than in the Arbalete speargun.

In FIG. 10, the inventive speargun has a piston with a diameter of 17, a reservoir with a diameter of 33 and a compression ratio of 1:1.36.

With air pressurized to 22 bar, the force increases from 36.8 kg to 50 kg, with a stored energy of 3689 Kg·cm, i.e. about 227% higher than in the Arbalete speargun.

With air pressurized to 16 bar, the force increases from 26.4 kg to 36 kg, with a stored energy of 2652 Kg·cm, i.e. about 163% higher than in the Arbalete speargun.

In FIG. 11, the inventive speargun has a piston with a diameter of 15 and a compression ratio of 1:1.18.

The force increases from 25.4 kg to 30 kg, with a stored energy of 2354.5 Kg·cm, i.e. about 45% higher than in the Arbalete speargun, while the loading operation is considerably facilitated.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become apparent to those skilled in the art and the scope of the present invention is limited only by the appended claims.

The invention claimed is:

1. A pneumatic speargun for spearfishing comprising:
   a cylinder (1) having a head (10) at a front of said cylinder and a body with a hand grip (11) at a back of said cylinder;
   a continuous or discontinuous slide guide (2) for a spear (7);
   a reservoir (3) for a pressurized fluid;
   a barrel (4) connected with said reservoir (3);
   a piston (5) slidingly mounted in said barrel (4), for movement from one or more loading positions, in which said piston is retained by a retaining system, to an end discharge position; and
   a triggering system configured to release said retaining system and cause the piston (5) to move from the selected end loading position to the end discharge position, said piston (5) in the loading position being mechanically connected to said spear (7) such that the piston causes the spear (5) to be propelled as the piston (5) moves from the selected end loading position to the end discharge position,
   wherein said piston (5) is removably connected to the spear (7) via a cable (6) and a return system, such that the piston (5) is moved from the end discharge position to the selected end loading position by pulling said cable (6).

2. The pneumatic speargun as claimed in claim 1, wherein said continuous or discontinuous slide guide (2) is located at a top of said cylinder (1).

3. The pneumatic speargun as claimed in claim 1, wherein the barrel (4) is kept watertight by a hydraulic seal configured to lead the cable (6) out of an end of the barrel (4) proximate to the selected end loading position of the piston (5).

4. The pneumatic speargun as claimed in claim 1, wherein the return system comprises a pulley $(13, 13^I, 13^{II}, 13^{III}, 13^{IV})$ at one or both of the head (10) or a body of the speargun.

5. The pneumatic speargun as claimed in claim 1, wherein the end loading position is proximate to the front of the cylinder (1) and the end discharge position is proximate to the back of the cylinder (1).

6. The pneumatic speargun as claimed in claim 5, wherein the head (10) has a pulley (13) such that the cable that comes out of the barrel (4) is returned toward a bottom of the cylinder (1), where it forms a loop (60) around the cylinder (1).

7. The pneumatic speargun as claimed in claim 5, wherein the cable (6) is divided into two parts that come out of the barrel (4), the head (10) having two or more pulleys $(13^I, 13^{II})$, such that the two parts of the cable (6) that come out of the barrel (4) are returned toward a top of the cylinder (1), where they join into a loop (60).

8. The pneumatic speargun as claimed in claim 1, wherein the end loading position is proximate to the back of the cylinder (1) and the end discharge position is proximate to the front of the cylinder (1).

9. The pneumatic speargun as claimed in claim 8, wherein at least one rear pulley (14) is provided in a body of the speargun, proximate to the back of the barrel (4), such that the cable (6) comes out of the barrel and is returned toward a bottom of the cylinder (1), where it forms a loop (7) having two branches that extend toward the head (10), the head having two or more front pulleys $(13^I, 13^{II}, 13^{III}, 13^{IV})$, such that the two branches of the loop (60) are returned toward a top of the cylinder (1).

10. The pneumatic speargun as claimed in claim 9, wherein the cylinder (1) has a fairing (15) at a bottom thereof configured to house a portion of the cable (6) between the rear pulley (15) and the front pulleys $(13^{III}, 13^{IV})$.

11. The pneumatic speargun as claimed in claim 1, wherein the reservoir (3) is coaxially arranged around the barrel (4).

12. The pneumatic speargun as claimed in claim 1, wherein the reservoir (3) consists of the barrel (4).

13. The pneumatic speargun as claimed in claim 1, wherein the barrel (4) is open in the direction of the end discharge position of the piston (5).

14. The pneumatic speargun as claimed in claim 13, wherein a system is provided that holds the piston (5) in the selected end loading position, said system holding the piston (5) being designed to be disengaged by said triggering system for releasing said retaining system, such that the piston 5 may be loaded like a traditional pneumatic speargun by introducing the spear 7 into the barrel 4 and pushing the piston 5 to the selected end loading position with the spear 7.

* * * * *